US009049712B2

(12) United States Patent
Baker et al.

(10) Patent No.: US 9,049,712 B2
(45) Date of Patent: *Jun. 2, 2015

(54) METHOD AND APPARATUS FOR SEARCH SPACE CONFIGURATION FOR ENHANCED PHYSICAL DOWNLINK CONTROL CHANNEL

(71) Applicant: Alcatel-Lucent, Paris (FR)

(72) Inventors: Matthew Baker, Canterbury (GB); Fang-chen Cheng, Randolph, NJ (US); Sigen Ye, New Providence, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/246,662

(22) Filed: Apr. 7, 2014

(65) Prior Publication Data

US 2014/0219211 A1    Aug. 7, 2014

Related U.S. Application Data

(63) Continuation of application No. 13/423,369, filed on Mar. 19, 2012, now Pat. No. 8,737,251.

(51) Int. Cl.
*H04W 72/04* (2009.01)
*H04W 48/12* (2009.01)

(52) U.S. Cl.
CPC ............ *H04W 72/042* (2013.01); *H04W 48/12* (2013.01)

(58) Field of Classification Search
USPC ......... 370/252, 329, 330, 341, 464, 465, 468; 455/450–452.2
See application file for complete search history.

(56) References Cited

U.S. PATENT DOCUMENTS

2009/0274077 A1    11/2009    Meylan et al.
2010/0159938 A1    6/2010    Shin et al.
(Continued)

FOREIGN PATENT DOCUMENTS

WO    WO-2011016377 A1    2/2011
WO    WO-2011065442 A1    6/2011

OTHER PUBLICATIONS

Fujitsu, "Search Space Design for Downlink Control Channel," 3GPP Draft, R1-120752 Search Space Design for Downlink Control Channel, 3rd Generation Partnership Project (3GPP), Mobile Competence Centre, 650 Route Des Lucioles, F-06921 Sophia-Antipolis Cedex, France, vol. RAN WG1, No. Dresden, Germany, Feb. 6, 2012, XP050563277, retrieved on Feb. 1, 2012.

(Continued)

*Primary Examiner* — Kerri Rose
(74) *Attorney, Agent, or Firm* — Harness, Dickey & Pierce

(57) ABSTRACT

In one embodiment, the method of configuring a common search space (CSS) for at least one user equipment (UE) in a wireless communication system with at least a first type of physical downlink control channel includes broadcasting at least one parameter of a common search space (CSS), none of the parameters being the number of orthogonal frequency-division multiplex (OFDM) symbols. In one embodiment, a method of configuring a default user equipment-specific search space (USS) for a user equipment (UE) in a wireless communication system with at least a first type of physical downlink control channel includes broadcasting at least one parameter of the default USS, none of the parameters being based on an identifier of the UE. The broadcasting may occur before UE-specific signaling. In one embodiment, a method of configuring or reconfiguring the USS may include transmitting at least one parameter of the USS with UE-specific signaling.

20 Claims, 4 Drawing Sheets

(56) References Cited

U.S. PATENT DOCUMENTS

| | | |
|---|---|---|
| 2011/0243090 A1 | 10/2011 | Grovlen et al. |
| 2012/0063351 A1 | 3/2012 | Kim et al. |
| 2012/0188961 A1 | 7/2012 | Suzuki et al. |
| 2012/0281576 A1* | 11/2012 | Yamada et al. ............... 370/252 |
| 2013/0064196 A1 | 3/2013 | Gao et al. |
| 2013/0194956 A1 | 8/2013 | Sartori et al. |

OTHER PUBLICATIONS

International Search Report and Written Opinion dated Jun. 26, 2013.
International Preliminary Report on Patentability and Written Opinion issued in International Application No. PCT/US2013/030668, mailed Oct. 2, 2014.

* cited by examiner

METHOD AND APPARATUS FOR SEARCH SPACE CONFIGURATION FOR ENHANCED PHYSICAL DOWNLINK CONTROL CHANNEL

PRIORITY STATEMENT

This application is a Continuation of U.S. patent application Ser. No. 13/423,369, filed on Mar. 19, 2012, the contents of which is incorporated by reference in its entirety.

BACKGROUND

As the demand for mobile broadband access continues to increase, there exists a need for further improvements in Long Term Evolution (LTE) technology. Third Generation Partnership Project (3GPP) LTE Rel-11 is part of a wireless industry effort to provide these further improvements.

The base station in a system supporting LTE is called an eNodeB. In order for an eNodeB to effectively provide user services, the eNodeB must provide control signaling, such as paging and other common signaling, to user equipment (UE). This signaling is provided over special control channels. Every active UE served by the eNodeB must listen to a control channel in order to receive services. Among other enhancements, 3GPP LTE Rel-11 is directed toward improvements to these control channels, including the ways in which a UE listens to, or monitors control channels. However, enhanced control channels must coexist with legacy control channels on a same carrier before all the legacy UEs phase out, in order that legacy UEs may still be served by these eNodeBs. Enhanced control channels should also support stand-alone operations after all the legacy UEs are replaced.

SUMMARY

Embodiments relate to a method and/or apparatus for configuring a common search space (CSS) for at least one user equipment (UE) in a wireless communication system with at least a first type of physical downlink control channel.

In one embodiment, the method of configuring a physical downlink control channel common search space (CSS) for at least one user equipment (UE) in a wireless communication system with at least a first type of physical downlink control channel includes broadcasting at least one parameter of the CSS, none of the parameters being a number of orthogonal frequency-division multiplex (OFDM) symbols.

In one embodiment, the wireless communication system further includes a second type of physical downlink control channel, and at least one parameter indicates which of the types of physical downlink control channels the at least one UE must use to monitor the CSS.

In one embodiment, another of the at least one parameter indicates that the at least one UE must use the first type of physical downlink control channel to monitor the CSS.

In one embodiment, the at least one parameter indicates at least one frequency location of the CSS.

In one embodiment, a method of configuring a default user equipment-specific search space (USS) for a user equipment (UE) in a wireless communication system with at least a first type of physical downlink control channel includes broadcasting at least one parameter of the default USS, none of the parameters being based on an identifier of the UE. The broadcasting may occur before UE-specific signaling.

In one embodiment, the at least one parameter indicates at least one frequency location of the USS.

In one embodiment, the at least one parameter indicates an aggregation level of the USS.

In one embodiment, the wireless communication system further includes a second type of physical downlink control channel. At least one parameter indicates whether the USS is on a physical downlink control channel of the first type, a physical downlink control channel of the second type, or split between a physical downlink control channel of the first type and a physical downlink control channel of the second type.

In one embodiment, the at least one parameter indicates whether a USS uses distributed transmission, localized transmission, or both distributed transmission and localized transmission.

In one embodiment, a method for configuring or reconfiguring the user equipment-specific search space (USS) for a user equipment (UE), in a wireless communication system with at least a first type of physical downlink control channel includes transmitting at least one parameter of the USS with UE-specific signaling, none of the parameters being based on an identifier of the UE.

In one embodiment, a method for monitoring a common search space (CSS) in a wireless communication system with at least a first type of physical downlink control channel includes receiving a broadcast signal including at least one parameter of a common search space (CSS). The at least one parameter indicates which of a plurality of control channels is to be used to monitor the CSS.

In one embodiment, a UE for monitoring control channels in a wireless system is configured to receive a broadcast signal including at least one parameter of a common search space (CSS), the at least one parameter indicating which of a plurality of control channels to use for monitoring the CSS. The UE is further configured to monitor the CSS using a control channel of the plurality of control channels based on the received at least one parameter.

In one embodiment, an apparatus for configuring a physical downlink control channel common search space (CSS) for at least one user equipment (UE) in a wireless communication system with at least a first type of physical downlink control channel includes a processor and an associated memory. The processor is configured to control broadcasting of at least one parameter of the CSS, none of the parameters being a number of orthogonal frequency-division multiplex (OFDM) symbols.

In one embodiment, the wireless communication system further includes a second type of physical downlink control channel. At least one parameter indicates which of the types of physical downlink control channels the at least one UE must use to monitor the CSS.

In one embodiment, the at least one parameter indicates that the at least one UE must use the first type of physical downlink control channel to monitor the CSS.

In one embodiment, the at least one parameter indicates at least one frequency location of the CSS.

In one embodiment, an apparatus configuring a default user equipment-specific search space (USS) for a user equipment (UE), in a wireless communication system with at least a first type of physical downlink control channel includes a processor and an associated memory. The processor is configured to control broadcasting of at least one parameter of the default USS, none of the parameters being based on an identifier of the UE, the broadcasting occurring before UE-specific signaling.

In one embodiment, the at least one parameter indicates at least one frequency location of the USS.

In one embodiment, the at least one parameter indicates an aggregation level of the USS.

In one embodiment, the wireless communication system further includes a second type of physical downlink control channel. The at least one parameter indicates whether the USS is on a physical downlink control channel of the first type, a physical downlink control channel of the second type, or split between a physical downlink control channel of the first type and a physical downlink control channel of the second type.

In one embodiment, the at least one parameter indicates whether a USS uses distributed transmission, localized transmission, or both distributed transmission and localized transmission.

In one embodiment, the processor is further configured to control the transmitting at least one parameter to reconfigure the default USS.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present disclosure, and wherein.

DETAILED DESCRIPTION OF EXAMPLE EMBODIMENTS

Figure 1:
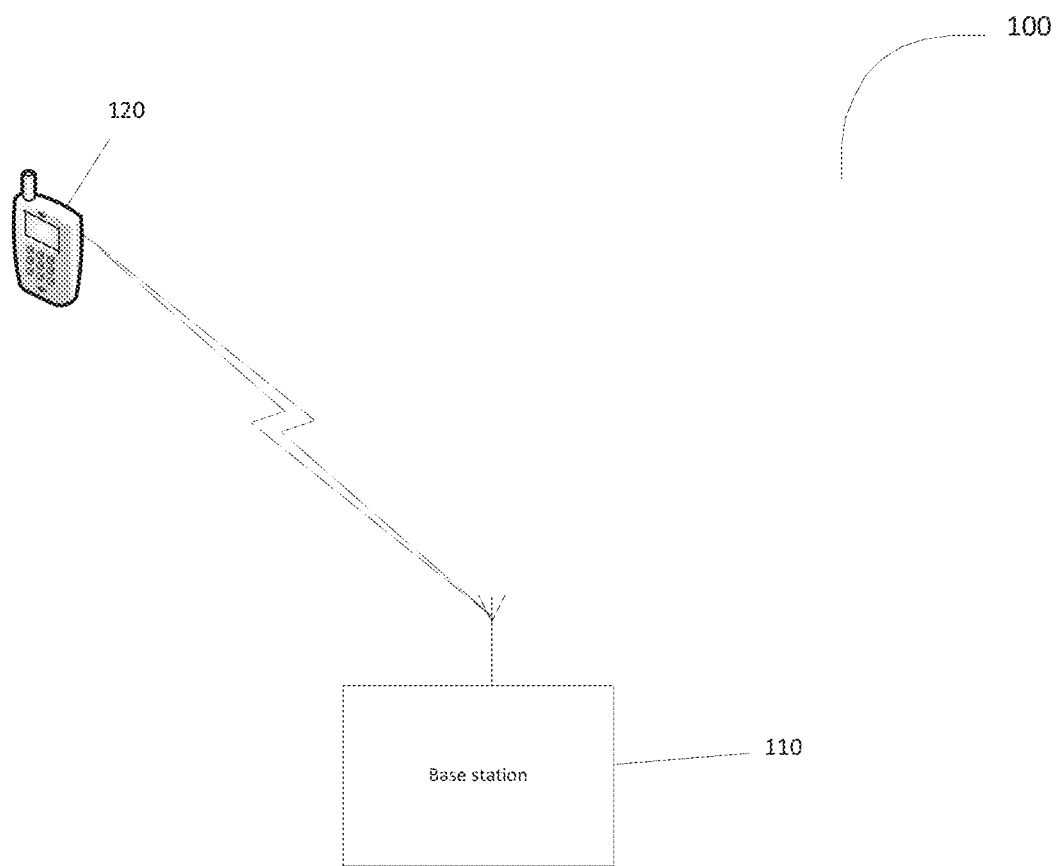
FIG. 1 illustrates a system in which example embodiments are implemented.

Various embodiments of the present disclosure will now be described more fully with reference to the accompanying drawings. Like elements on the drawings are labeled by like reference numerals.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected,' or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs), computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware, or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

Example embodiments may be utilized in conjunction with RANs such as: Worldwide Interoperability for Microwave Access (WiMAX); ultra mobile broadband (UMB); and $3^{rd}$ Generation Partnership Project Long Term Evolution (3GPP LTE).

An eNodeB in an LTE system generates control channels containing downlink control information messages. The eNodeB transmits control information over these channels to user equipment (UE). This control signaling is required in order for a UE to successfully receive, demodulate, and decode data transmitted over downlink traffic channels. In 3GPP Rel-8/9/10 systems, control signals are transmitted over a physical downlink control channel (PDCCH). 3GPP Rel-11 provides an enhanced physical downlink control channel (ePDCCH).

Multiple PDCCHs and ePDCCHs may be supported and provided in any eNodeB system. Not all of these PDCCHs and ePDCCHs may be relevant to a particular UE and UE resources may be wasted if the UE monitors all PDCCHs and ePDCCHs of an eNodeB. Therefore, an eNodeB control region is sub-divided into common search spaces (CSS) and UE-specific search spaces (USS) that the UE should monitor. Each space includes a number of PDCCH or ePDCCH candidates. The size of a search space is determined by the number of PDCCH or ePDCCH candidates.

In example embodiments, a method is provided to allow UEs to initially access the CSS on ePDCCH or PDCCH before any UE-specific signaling. The method, in example embodiments, allows a UE to monitor CSSs in the idle state for system information block (SIB) and paging messages, and during the initial access for random access response. Example embodiments provide a way for UEs to know where CSSs are in order that the UEs may monitor the CSSs. Example embodiments support the standalone operation of ePDCCH and the co-existence of ePDCCH and legacy PDCCH. Example embodiments further provide methods for configuring and re-configuring USSs.

FIG. 1 illustrates a system in which example embodiments are implemented.

Referring to FIG. 1, the system 100 includes at least one base station 110. The base station 110 may be an LTE eNodeB. A base station 110 according to one example embodiment is described in further detail with respect to FIG. 2 below.

The base station 110 serves a geographical region. It should be understood that, while the system 100 depicts only one base station 110, there may be additional, adjacent base stations serving adjacent geographic regions.

The system 100 may include one or more LTE UEs 120. The LTE UEs 120 may support any or all of 3GPP Rel-8/9/10 or 11. It should be understood that at any point in time there may be no LTE UEs 120 served by the base station 110. It should further be understood that at any given point in time all LTE UEs 120 served by the base station 110 may support 3GPP Rel-11 or alternatively no LTE UEs 120 served by the base station 110 may support 3GPP Rel-11.

Figure 2:
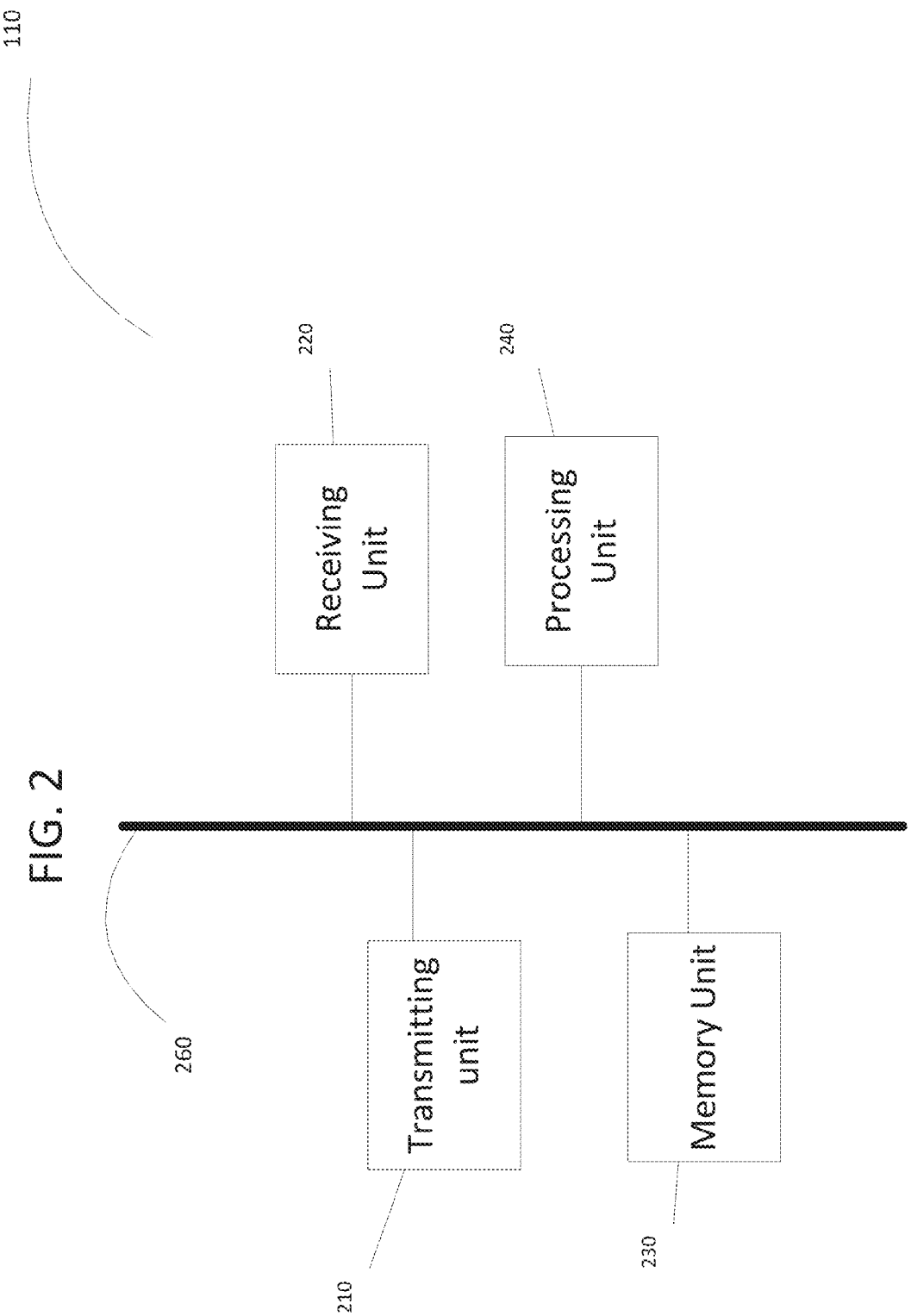
FIG. 2 illustrates a structure of a network element for implementing methods according to at least one example embodiment.

FIG. 2 is a diagram illustrating a structure of a base station 110 for implementing methods according to at least one example embodiment. The base station 110 may be any network element which broadcasts to LTE UEs 120 connected to the wireless network.

The transmitting unit 210, receiving unit 220, memory unit 230, and processing unit 240 may send data to and/or receive data from one another using the data bus 260. The transmitting unit 210 is a device that includes hardware and any necessary software for transmitting wired and/or wireless signals including, for example, data signals and control signals, via one or more wired and/or wireless connections to network elements in the wireless communications network 100. For example, data signals transmitted by the transmitting unit 210 may include configuration settings for CSSs and USSs sent to the LTE UEs 120.

The receiving unit 220 is a device that includes hardware and any necessary software for receiving wired and/or wireless signals including, for example, data signals and control signals, via one or more wired and/or wireless connections to network elements in the wireless communications network 100.

The memory unit 230 may be any device capable of storing data including magnetic storage, flash storage, etc.

The processing unit 240 may be any device capable of processing data including, for example, a microprocessor configured to carry out specific operations based on input data, or capable of executing instructions included in computer readable code.

Aspects of the example embodiments provide CSS configuration and USS configuration. However, it will be understood that at least one example embodiment may provide only CSS configuration. A further example embodiment may provide only USS configuration. At least another example embodiment may configure both a CSS and a USS. Example embodiments for providing CSS configuration and USS configuration are further and separately described below.

CSS Configuration

In at least one embodiment, the base station 110 broadcasts a signal to the LTE UE 120 over a broadcast channel, which will be described in greater detail below. The signal includes one or more parameters for configuration of a CSS. At least one parameter is not the number of OFDM symbols occupied by the CSS. For example, in one embodiment, none of the parameters indicates the number of OFDM symbols occupied by the CSS.

The base station 110 may broadcast a parameter indicating which of a plurality of control channels is to be monitored for the CSS. For example, the base station 110 may broadcast a parameter that indicates that the LTE UE 120 should monitor a PDCCH. In at least another example embodiment, the base station 110 may broadcast a parameter that indicates that the LTE UE 120 should monitor an ePDCCH.

In at least one example embodiment, the base station 110 may broadcast a parameter indicating that more than one control channel contains the CSS. In at least this example embodiment, a ranking of control channels is pre-defined or provided by the base station, and the LTE UE 120 must monitor the CSS on the highest-ranked control channel that the LTE UE 120 is capable of receiving. For example, LTE UEs with the capability of receiving ePDCCH must to monitor the CSS on the ePDCCH if the ePDCCH is the highest-ranked control channel.

The base station 110 may broadcast a parameter indicating the frequency location or frequency locations of the CSS, for example, in terms of physical resource blocks (PRBs). By transmitting this parameter, the base station 110 enables inter-cell interference coordination (ICIC) in the frequency domain. As is known, ICIC may include one or more interference avoidance schemes.

The base station 110 may broadcast a parameter indicating whether distributed or localized transmission is used for the CSS. In other words, the base station 110 may broadcast a parameter that indicates whether each control channel message or part of a message (for example, a control channel element (CCE)) is transmitted in a single physical resource block (PRB) or in multiple PRBs that are non-contiguous in the frequency domain.

The base station 110 may broadcast at least one of the parameters discussed above by inserting additional bits in a broadcast channel that also carries other broadcast information. For example, the base station 110 may broadcast at least one parameter in a physical broadcast channel (PBCH). In addition, the base station 110 may broadcast at least one of the parameters discussed above in a new broadcast channel separate from any existing broadcast channel.

In at least one example embodiment, the base station 110 may broadcast at least one of the parameters discussed above by explicitly broadcasting the parameter value. In at least one example embodiment, the base station 110 may provide, to the LTE UE 120, a pointer or other indicator to a pre-defined set of parameter values, previously stored at the LTE UE 120. The base station 110 may provide a pointer to a pre-defined set of parameter values in order to reduce signaling overhead.

In example embodiments, therefore, the LTE UE 120 receives sufficient information that fully defines a CSS, in order that the LTE UE 120 knows where the CSS is and can monitor control channels.

USS Configuration

In at least one example embodiment, the base station 110 broadcasts parameters to provide a default USS for a specific LTE UE 120. The LTE UE 120 may monitor the default USS prior to receiving any configuration or reconfiguration signaling. In contrast to 3GPP Rel-8/9/10, the default USS is not entirely based on or derived from an identity of the UE. At least one or more parameters broadcast by the base station 110 are used to determine the default USS.

In an example embodiment, the base station 110 may broadcast a parameter indicating the frequency location or a plurality of frequency locations for the USS. The base station 110 broadcasts at least one frequency location in order that ICIC, discussed above, may be implemented. The at least one frequency location may include the bandwidth within which the USS may hop from subframe to subframe. In other words, hopping under 3GPP LTE Rel-11 may now occur within the configured frequency locations rather than within the entire bandwidth.

In an example embodiment, the base station 110 may broadcast a parameter indicating the aggregation level for the USS. An aggregation level of N, as is known, implies that N CCEs are aggregated for each control channel message. Therefore, N determines the code rate of the USS. As is known, a higher aggregation level implies that more resources are needed. A higher aggregation level may be required, for example, where the signal may be weaker, for example at a cell edge.

In an example embodiment, the base station 110 may broadcast a parameter indicating whether the default USS is the same as the CSS. When the default USS is indicated to be the same as the CSS, the default USS is no longer based on any identity of the UE, and the LTE UE 120 derives the USS following the same procedure and parameters for deriving the CSS.

In an example embodiment, the base station 110 may broadcast a parameter indicating which of a plurality of control channels is to be monitored for the default USS. In at least one example embodiment, the default USS may be completely encompassed in a legacy PDCCH. In other words, the more complete definition of the USS may follow 3GPP LTE Rel-8/9/10 specifications. In at least this example embodiment, no further signaling is needed to fully define the USS. In at least another example embodiment, the parameter may indicate that the default USS is completely encompassed in the ePDCCH. In at least this example embodiment, the frequency location of the USS may be the same as the frequency location of the CSS. In yet another example embodiment, this parameter may indicate that the default USS is split between an ePDCCH and a legacy PDCCH. In at least this example embodiment, the base station 110 provides further configuration of the USS.

In at least one embodiment, the base station 110 broadcasts a parameter indicating whether the default USS on ePDCCH uses distributed transmission only, localized transmission only, or a mixture of distributed and localized transmission.

The base station 110 may broadcast a parameter indicating that distribution transmission should be used in example embodiments using frequency division duplex (FDD). In at least these embodiments, the default USS may be used before other radio resource configuration (RRC) is performed. In at least these embodiments, channel state information (CSI) feedback has not yet been configured, and the base station 110 sets the parameter to require distributed transmission because the base station cannot otherwise perform frequency-selective scheduling of the ePDCCH.

In example embodiments using time division duplex (TDD), the base station 110 may broadcast a parameter indicating that both distributed transmission and localized transmission should be used. In at least these embodiments, the base station 110 may use channel reciprocity to schedule localized transmission for ePDCCH.

In example embodiments, the base station 110 may broadcast parameters defining eCCE to DM-RS antenna port mapping. In example embodiments, the base station 110 may broadcast parameters defining DM-RS sequences.

In an example embodiment, the base station 110 may transmit at least one of the parameters discussed above in a signaling message during the random access procedure. In an example embodiment, a serving base station 110 may transmit at least one of the parameters discussed above in a handover message before handover to a target cell. In a still further example embodiment, a serving base station 110 may transmit at least one of the parameters discussed above in higher-layer signaling such as RRC signaling.

In at least one example embodiment, the base station 110 may reconfigure the USS. The base station 110 may reconfigure the USS when the CSI feedback becomes useful. For example, the CSI feedback may become useful due to stronger signal, slower channel variation, and/or more frequent CSI reporting. In an example embodiment, the base station 110 may reconfigure the USS when the CSI feedback becomes unreliable. For example, the CSI feedback may become unreliable due to weaker signal, faster channel variation and/or less frequent CSI reporting. In a still further example embodiment, the base station 110 may reconfigure the USS when the base station 1110 needs to reconfigure the frequency location of the LTE UE 120. For example, the base station 110 may need to reconfigure the frequency location in order to implement ICIC, discussed previously.

In example embodiments, the base station 110 configures the USS of the LTE UE 120 such that at least some candidate within the USS use distributed transmission with a relatively high aggregation level. The base station 110 may do so in order to ensure robustness when the CSI feedback becomes too unreliable and not able to perform effective localized transmission.

In at least one example embodiment, similar to the case of CSS configuration, the base station 110 may broadcast at least one of the parameters discussed above by explicitly broadcasting the parameter value. In at least one example embodiment, the base station 110 may provide, to the LTE UE 120, a pointer or other indicator to a pre-defined set of parameter values. The base station 110 may provide a pointer to a pre-defined set of parameter values in order to reduce signaling overhead.

Example embodiments, therefore, provide a default USS that is defined before the base station 110 can send any UE-specific signaling to the LTE UE 120.

Figure 3:
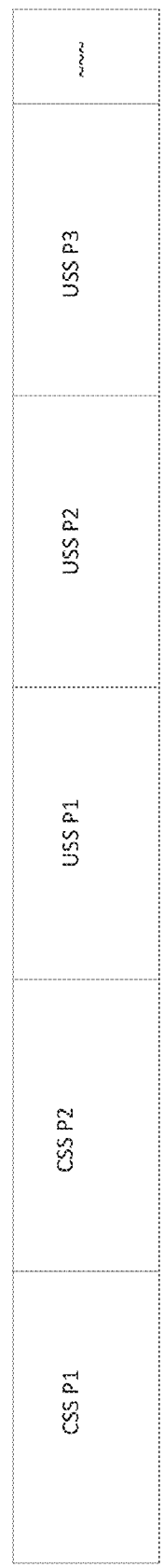
FIG. 3 illustrates a broadcast signal including parameters for configuring search spaces according to an embodiment.

FIG. 3 illustrates an example broadcast signal including CSS parameters CSS P1 and CSS P2 and USS parameters USS P1, USS P2 and USSP3 as described above in example embodiments. It should be noted that CSS parameters and USS parameters are not necessarily carried together in a same message. Further, it should be noted that a given parameter may be shared between CSS and USS configurations. As an example, the frequency location parameter may be shared between both types of configurations in example embodiments.

Figure 4A:
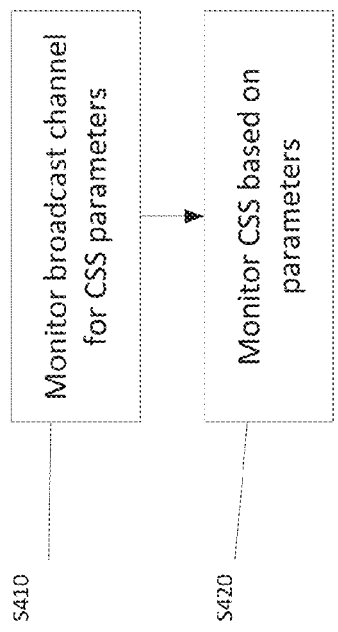
FIGS. 4A and 4B illustrate methods implemented by a user equipment (UE) according to embodiments.
Figure 4B:
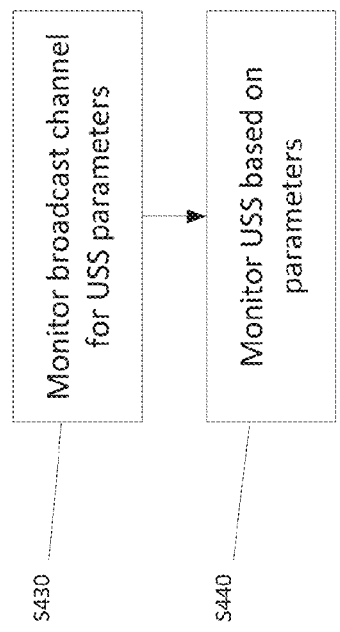

FIGS. 4A and 4B illustrate methods used of monitoring a CSS and a USS according to example embodiments. These methods may be implemented by an LTE UE 120 served by the base station 110. In at least some example embodiments, an LTE UE 120 monitors a CSS. At step S410, the LTE UE 120 monitors a broadcast channel and receives a broadcast signal including at least one parameter of a CSS. In an example embodiment, the at least one parameter of the CSS indicate which of a plurality of control channels should be monitored for the CSS. In step S420, the LTE UE 120 monitors the CSS on the indicated control channel. At step S430, the LTE UE 120 monitors a broadcast channel and receives a broadcast signal including at least one parameter of a USS. In step S440, the LTE UE 120 monitors the USS on the indicated control channel.

Variations of the example embodiments are not to be regarded as a departure from the spirit and scope of the example embodiments, and all such variations as would be apparent to one skilled in the art are intended to be included within the scope of this disclosure.

What is claimed:

1. A method comprising:
broadcasting, by a base station over a physical broadcast channel of a wireless communication system, at least one parameter of a search space, said at least one parameter identifying at least one system physical downlink control channel, and where none of the parameters is a number of orthogonal frequency division multiplex (OFDM) symbols.

2. The method of claim 1 where the search space is a common search space (CSS).

3. The method of claim 2 where the at least one parameter indicates which of a plurality of control channels is to be monitored for the CSS.

4. The method of claim 2 where the at least one parameter indicates that more than one control channel contains the CSS.

5. The method of claim 2 where the at least one parameter indicates one or more frequency locations of the CSS.

6. The method of claim 5 where the one or more frequency locations are expressed in terms of physical resource blocks (PRBs).

7. The method of claim 6 where the at least one parameter indicates whether control messages broadcast over the physical downlink control channel by the base station are transmitted over a single physical resource block or in multiple non-contiguous frequency physical resource blocks.

8. The method of claim 1 where the search space is a default user equipment-specific search space (USS), the at least one parameter is that of the default USS where none of the parameters is based on an identifier of a user equipment, and the broadcasting occurs before user equipment signaling.

9. A method comprising:
receiving, by a user equipment (UE) over a physical broadcast channel of a wireless communication system, a broadcast of at least one parameter of a search space, the at least one parameter identifying at least one physical downlink control channel of the communication system, where none of the parameters is based on an identifier of the UE, and where the broadcasting occurs before UE-specific signaling.

10. The method of claim 9 where the search space is a default user-specific search space (USS).

11. The method of claim 10 where the at least one parameter indicates one or more frequency locations for the default USS.

12. The method of claim 10 where the at least one parameter indicates which of a plurality of physical downlink control channels is to be monitored for the default USS.

13. The method of claim 10 where the wireless communication system is an LTE (Long Term Evolution) system and the default USS is encompassed in the at least one physical downlink control channel.

14. The method of claim 10 where the wireless communication system is an LTE system and the default USS is encompassed in an enhanced physical downlink control channel.

15. The method of claim 14 where the at least one parameter for the default USS encompassed in an enhanced physical downlink control channel indicates whether the default USS uses one of a distributed transmission, a localized transmission, and a mixture of distributed and localized transmission.

16. The method of claim 10 where the wireless communication system is an LTE system and the default USS is split between an enhanced physical downlink control channel and a legacy physical downlink control channel.

17. The method of claim 9 where the search space is a common search space (CSS) and the at least one parameter is at least one parameter of the CSS.

18. The method of claim 17 where said at least one parameter indicates which of a plurality of control channels should be monitored for the CSS.

19. The method of claim 9 where the UE monitors a user-specific search space (USS) on a control channel indicated by the at least one parameter where said at least one parameter is at least one parameter of the USS.

20. The method of claim 9 where the search space is a user-specific search space (USS) and the at least one parameter indicates an aggregation level, of a particular value, for the USS where the aggregation level value determines a code rate for the USS and each control message received over the at least one physical downlink control channel comprises a number of control channel elements (CCEs) aggregated to each other where the number of CCEs is equal to the value of the aggregation level.

* * * * *